(12) United States Patent
Iwanaga

(10) Patent No.: US 6,459,661 B1
(45) Date of Patent: Oct. 1, 2002

(54) OPTICAL DISK AND OPTICAL DISK DEVICE

(75) Inventor: Toshiaki Iwanaga, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/398,204

(22) Filed: Sep. 17, 1999

(30) Foreign Application Priority Data

Sep. 17, 1998 (JP) .......................................... 10-262794

(51) Int. Cl.$^7$ ................................................. G11B 7/00
(52) U.S. Cl. ............................... 369/44.26; 369/775.3; 369/47.27
(58) Field of Search ........................... 369/275.2, 275.3, 369/44.26, 47.27

(56) References Cited

U.S. PATENT DOCUMENTS

| | | | |
|---|---|---|---|
| 5,422,874 A | 6/1995 | Birukawa et al. | 369/275.2 |
| 5,657,312 A | 8/1997 | Hayashi | |
| 5,740,154 A | 4/1998 | Izumi et al. | 369/275.3 |
| 5,805,565 A | 9/1998 | Miyamoto et al. | 369/275.4 |
| 5,878,008 A | 3/1999 | Miyamoto et al. | 369/44.34 |
| 5,898,663 A | 4/1999 | Miyamoto et al. | 369/275.4 |
| 5,953,310 A | 9/1999 | Miyamoto et al. | 369/275.3 |
| 6,337,839 B1 * | 1/2000 | Nakane et al. | 369/59.29 |
| 6,295,271 B1 * | 9/2001 | Inui et al. | 369/275.4 |

FOREIGN PATENT DOCUMENTS

| | | |
|---|---|---|
| EP | 0 727 779 | 8/1996 |
| EP | 0 896 325 | 2/1999 |
| GB | 2 307 770 | 6/1997 |
| JP | 6-176404 | 6/1994 |
| JP | 7-44871 | 2/1995 |
| JP | 7-254156 | 10/1995 |
| JP | 9-63137 | 3/1997 |
| JP | 9-73665 | 3/1997 |
| JP | 2 788 022 | 6/1998 |
| WO | 98/19302 | 5/1998 |

OTHER PUBLICATIONS

Yasuhiro; "Optical Disk and Optical Disk Device Constituted by Using the Desk"; Patent Abstracts of Japan; vol. 018, No. 519; Sep. 29, 1994; JP 06 176404; Jun. 24, 1994; Abstract.

* cited by examiner

Primary Examiner—Nabil Hindi
(74) Attorney, Agent, or Firm—Foley & Lardner

(57) ABSTRACT

An optical disk provided with a land region and a groove region that are formed on a substrate, the land region and groove region being used as a recording track that is the medium of the recording/playback of information signal, and a pre-pit region that is formed at the boundary part of neighboring land region and groove region and is disposed every other boundary part, the pre-pit region including specific information. Characteristically, the specific information's in neighboring pre-pit regions are not aligned in the radius direction of the optical disk.

9 Claims, 16 Drawing Sheets

OPTICAL DISK AND OPTICAL DISK DEVICE

FIELD OF THE INVENTION

This invention relates to a disk format on optical disk, and to an optical disk device that can conduct the recording and playback of such an optical disk.

BACKGROUND OF THE INVENTION

In recent years, for a rewritable optical disk with a large capacity, a land/groove recording system that a region between grooves is also used as an information track, as well as a groove provided as a guide trench on optical disk is suggested. The land and groove may be called convex part and concave part, respectively, or called inter-groove part and groove part, respectively. First, an optical disk used in the conventional land/groove recording system is explained.

FIG. 1 is a partial enlarged plan view showing a conventional optical disk that is described in Japanese patent No. 2,663,817. In FIG. 1, G indicates a groove region, L indicates a land region, Tp indicates a track pitch, P indicates a pre-pit, and BS indicates a focused beam spot. Also, "identification signal region" in Japanese patent No. 2,663,817 is called "header region" herein. In this disk format, a header region including address information is shared between adjacent groove G and land L, and at least a part of information signal included in header region is shifted by Tp/4 to the center line of groove G and to the center line of land L, and in at least part of optical disk, the header region and recording data region each are formed in a radial pattern.

FIG. 2 is a block diagram showing the composition of an optical disk device used for the optical disk above. In FIG. 2, 100 is the optical disk, 103 is a half mirror serving as a beam splitter, 104 is an objective lens to converge collimated light passed through the half mirror 103 onto the optical disk 100, 105 is a collimator lens to collimate light from a semiconductor laser 106, and 108 is an optical detector to receive reflected light from the optical disk 100 passing though the objective lens 104 and the half mirror 103. The optical detector is composed of two light-receiving parts that are divided in parallel to the track direction (tangential direction of circumference) of the optical disk to obtain the tracking error signal. 102 is an actuator supporting the objective lens 104. Meanwhile, part 101 enclosed by a dotted line in FIG. 2 is attached to a head base (not shown), and compose an optical head.

On the other hand, 110 is a differential amplifier to which detection signal to be output from the optical detector 108 is input. 117 is a polarity inverter to which tracking error signal from the differential amplifier 110 and control signal L4 from a system controller 118 described later are input, and which controls the polarity of tracking error signal output to a tracking controller 116 according to the control signal L4. Hereupon, regarding the polarity of tracking control, when tracking error signal is input, with its polarity unaltered, from the differential amplifier 110 to the tracking controller 116, the tracking is pulled into the recording track of groove G. 116 is the tracking controller to which output signal from the polarity inverter 117 and control signal L1 from the system controller 118 are input, and which outputs tracking control signal to a driver 122 and a traverse controller 121. 109 is an adder amplifier to which detection signal output from the optical detector 108 is input and which outputs add signal. 112 is a waveform shaper to which a RF component from the adder amplifier is input, and which outputs digital signal to a playback signal processor 113 and a address playback circuit 114. 113 is the playback signal processor which outputs playback data to the output terminal. 114 is the address playback circuit to which digital signal from the waveform shaper 112 is input, and which outputs address signal. 115 is an address calculator to which address signal from the address playback circuit 114 and control signal L4 from the system controller 118 are input, and which outputs address signal to the system controller 118.

Also, 121 is the traverse controller which outputs drive current according to control signal from the system controller 118. 107 is a traverse motor which moves the optical head 101 in the radius direction of the optical disk 100 according to drive current from the traverse controller 121. 119 is a record signal processor to which record data is input and which outputs record signal to a laser (LD) driver 120. 120 is the LD driver to which control signal from the system controller 118 and record signal from the record signal processor 119 are input, and which supplies drive current to the semiconductor laser 106. 122 is the driver to which tracking control signal from the tracking controller 116 is input and which supplies drive current to the actuator 102. Meanwhile, the system controller 118 which outputs control signal L1, L4 to the tracking controller 116, the traverse controller 121, the address calculator 115, the polarity inverter 117, the record signal processor 119 and the LD driver 120, and to which address signal from the address calculator 115 is input.

The operation of the conventional optical disk device thus composed is explained below.

Light output from the semiconductor laser 106 is collimated by the collimator lens 105, passed through the beam splitter 103, converged onto the optical disk 100 by the objective lens 104. Laser light reflected on the optical disk 100 holds the information of record track, passing through the objective lens 104, being led through the beam splitter 103 to the optical detector 108. The optical detector 108 converts a variation in light quantity distribution of light beam supplied into electrical signal, outputting it to the differential amplifier 110, the adder amplifier 109. The differential amplifier 110 current-voltage-converts (I-V conversion) currents input, taking the difference of both voltages, outputting it as push-pull signal. The polarity inverter 117 judges whether the track accessed is a land or a groove according to control signal L4 from the system controller 118, inverting the polarity, for example, only when the track is a land. The tracking controller 116 outputs tracking control signal to the driver 122 according to the level of tracking error signal input, the driver 122 supplies current to the actuator according to this signal to control the position of the objective lens 104 in the radius direction across the recording track. Thereby, the optical spot can scan precisely on the track.

On the other hand, the adder amplifier 109 current-voltage-converts (I-V conversion) two currents output from the light-receiving part 108, adding both, outputting it as add signal to the waveform shaper 112. The waveform shaper 112 shapes data signal and address signal with an analogue waveform into a pulse waveform by data-slicing by a certain threshold value, outputting it to the playback signal processor 113 and the address playback circuit 114. The playback signal processor 113 demodulates digital data signal input, conducting the processing of error correction etc. to output it as playback data. The address playback circuit 114 demodulates digital address signal input, outputting it as position information on the disk to the address calculator 115. The address calculator 115 calculates the address of a sector accessed from address signal read out from the optical disk 100 and land/groove signal from the system controller 118. The calculation method is to judge referring to an address map etc. and then output the judgement signal.

The system controller 118 judges whether the light beam currently locates at a desired address based on this address signal. The traverse controller 121 outputs drive current to the traverse motor 107 according to control signal from the system controller 118 when shifting the optical head 101, thereby the optical head 101 is shifted to a target track. Hereupon, the tracking controller 116 suspends the tracking servo according to control signal L1 from the system controller 118. Also, in the normal playback mode, the traverse motor 107 is driven according to tracking error signal input from the tracking controller 116, and the optical head 101 is moved gradually in the radius direction as the playback operation proceeds. The record signal processor 119 adds an error correction code etc. to record data input, outputting it as encoded record data to the LD driver 120. When the system controller 118 sets the recording mode by control signal, the LD driver 120 modulates drive current applied to the semiconductor laser 106 according to record signal. Thereby, the intensity of light spots projected onto the optical disk 100 varies according to the record signal, record pits are formed. On the other hand, in the playback operation, the LD driver 120 is set to the playback mode by control signal, the drive current is controlled so that the semiconductor laser 106 emits light at a constant intensity. Thereby, the detection of record pit and pre-pit on record track is enabled.

Meanwhile, Japanese patent No. 2,663,817 discloses not only a technique that the detection of record pit and pre-pit is conducted using track add signal but also a way to detect a pre-pit using push-pull signal which is track difference signal. Namely, since the header region is positioned off-setting by Tp/4 from the record track in the radius direction, the detection using push-pull signal is enabled.

However, the optical disk and optical disk device using the land region and groove region as an information track have a significant weakness for the defocusing of focused beam. Namely, due to an error in the manufacturing of head or a deterioration in head performance with age, so-called defocusing that focused beam is converged deviating from a right focus position occurs. Hereupon, in the optical disk described above, information of adjacent header regions affects as a crosstalk. Especially, when one address information is a signal of short mark and other to crosstalk is a signal of long mark, a significant distortion of waveform is observed and an error in the reading of address information occurs. In this case, since the header region needs to be played back while waiting for the rotation, the throughput may be reduced. Also, when it is played back again, the reading error is highly like to recur. Therefore, since it may be registered as a defect sector, the reliability of device and disk must be thus reduced.

Also, in the optical disk device above, since the header region including address information is shared between adjacent groove and land, when an address to start the recording/playback is designated, the system controller judges whether the designated address is the land region or groove region by referring to an address map etc. Then, judgement signal (polarity signal) is output to the tracking servo system. After the tracking, detection signal of the physical address is address-converted by the judgement signal, thereby it is judged whether the tracking is carried out to the designated address. However, for example, when a large track offset occurs due to the failure of tracking, the tracking to the land or groove may not be performed as designated by polarity signal. Therefore, the judgement of address becomes unsuccessful and the operation of device goes out of control.

Also, in the header region, the influence of the pre-pit to servo error signal is to cause the focus offset and the disorder of track error signal, thereby incurring a unstable recording/playback. At the same time, when starting the recording after passing the header region, depending on the composition of optical head, there occurs a focus offset due to the chromatic aberration of objective lens, by a phenomenon called a jump of wavelength in semiconductor laser. This focus offset interferes with the focus offset occurring near the header region, thereby the focus control is made to be further unstable, causing a failure in recording.

SUMMARY OF THE INVENTION

Accordingly, it is an object of the invention to provide an optical disk with an enhanced reliability.

It is a further object of the invention to provide an optical disk device with an excellent stability of recording/playback.

According to the invention, an optical disk, comprises:
   a land region and a groove region that are formed on a substrate, the land region and groove region being used as a recording track that is the medium of the recording/playback of information signal; and
   a pre-pit region that is formed at the boundary part of neighboring land region and groove region and is disposed every other boundary part, the pre-pit region including specific information;
   wherein the specific information's in neighboring pre-pit regions are not aligned in the radius direction of the optical disk.

According to another aspect of the invention, an optical disk device for conducting the recording/playback of an optical disk comprising a land region and a groove region that are formed on a substrate, the land region and groove region being used as a recording track that is the medium of the recording/playback of information signal, and a pre-pit region that is formed at the boundary part of neighboring land region and groove region and is disposed every other boundary part, the pre-pit region including address information, comprises:
   means for outputting, in advance, as identifier 1 whether a recording track scanned by light beam is a land region or a groove region;
   a track region detection means for detecting whether the recording track scanned by light beam is a land region or a groove region and outputting the detection results as identifier 2;
   an address information extraction means for extracting address information from the pre-pit region scanned by light beam; and
   means for conducting the address calculation by receiving the inputs of the identifier 1, identifier 2 and address information.

According to another aspect of the invention, an optical disk device for conducting the recording/playback of an optical disk comprising a land region and a groove region that are formed on a substrate, the land region and groove region being used as a recording track that is the medium of the recording/playback of information signal, and a pre-pit region that is formed at the boundary part of neighboring land region and groove region and is disposed every other boundary part, the pre-pit region including address information, comprises:

a track region detection means for detecting whether a recording track scanned by light beam is a land region or a groove region;

means for detecting a push-pull signal as a track difference signal based on the output of the track region detection means;

a calculation means for calculating the track difference signal by setting a subtraction ratio between one signal output and other signal output of the two signal outputs used to calculate the track difference signal; and means for detecting address information from the output of the calculation means.

According to another aspect of the invention, an optical disk device for conducting the recording/playback of an optical disk comprising a land region and a groove region that are formed on a substrate, the land region and groove region being used as a recording track that is the medium of the recording/playback of information signal, and a pre-pit region that is formed at the boundary part of neighboring land region and groove region and is disposed every other boundary part, the pre-pit region including address information, comprises:

a header region detection means for outputting header region signal to indicate the position of a header region including the pre-pit region from a track add signal;

means for outputting first-order differential signal from a push-pull signal as a track difference signal;

means for outputting differential cross signal from the zero cross signal of the first-order differential signal;

a window comparator means for binarizing the amplitude of the first-order differential signal at a predetermined slice level; and a logical operation means for outputting track region detection signal to determine whether a track scanned by light beam is a land region or a groove region, from the header region signal, differential cross signal and output signal of the window comparator means.

According to another aspect of the invention, an optical disk device for conducting the recording/playback of an optical disk comprising a land region and a groove region that are formed on a substrate, the land region and groove region being used as a recording track that is the medium of the recording/playback of information signal, and a pre-pit region that is formed at the boundary part of neighboring land region and groove region and is disposed every other boundary part, the pre-pit region including address information, comprises:

means for outputting signal to detect whether a recording track scanned by light beam is a land region or a groove region;

a header region detection means for detecting a header region including the pre-pit region; and a servo error detection means for sampling a track error signal value at an arbitrary time before the output time of the header region detection means, and holding the track error signal value an arbitrary time or conducting an operation of the track error signal value and arbitrary waveform signal then outputting the operation result as servo error signal.

According to another aspect of the invention, an optical disk device for conducting the recording/playback of an optical disk comprising a land region and a groove region that are formed on a substrate, the land region and groove region being used as a recording track that is the medium of the recording/playback of information signal, and a pre-pit region that is formed at the boundary part of neighboring land region and groove region and is disposed every other boundary part, the pre-pit region including address information, comprises:

means for outputting signal to detect whether a recording track scanned by light beam is a land region or a groove region;

a header region detection means for detecting a header region including the pre-pit region; and a servo error detection means for sampling a focus error signal value at an arbitrary time before the output time of the header region detection means, and holding the track error signal value an arbitrary time or conducting an operation of the focus error signal value and arbitrary waveform signal then outputting the operation result as servo error signal.

According to another aspect of the invention, an optical disk device for conducting the recording/playback of an optical disk comprising a land region and a groove region that are formed on a substrate, the land region and groove region being used as a recording track that is the medium of the recording/playback of information signal, and a pre-pit region that is formed at the boundary part of neighboring land region and groove region and is disposed every other boundary part, the pre-pit region including address information, comprises:

means for outputting envelope signal or peak hold signal from track add signal to be input;

means for binarizing the envelope signal or peak hold signal to be input;

a burst detection means for detecting burst signal with a specific mark included in the pre-pit region then outputting burst detection signal; and a logical operation means for outputting binarized signal nearly enclosing the pre-pit region based on the output signal of the binarizing means and the burst detection signal.

According to another aspect of the invention, an optical disk device for conducting the recording/playback of an optical disk comprising a land region and a groove region that are formed on a substrate, the land region and groove region being used as a recording track that is the medium of the recording/playback of information signal, and a pre-pit region that is formed at the boundary part of neighboring land region and groove region and is disposed every other boundary part, the pre-pit region including address information, comprises:

means for generating replica signal under a condition that a crosstalk component from the neighboring pre-pit region at a position where address information is played back is clearly detected; and a crosstalk removing means for removing the replica signal as crosstalk component from a signal component played back.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
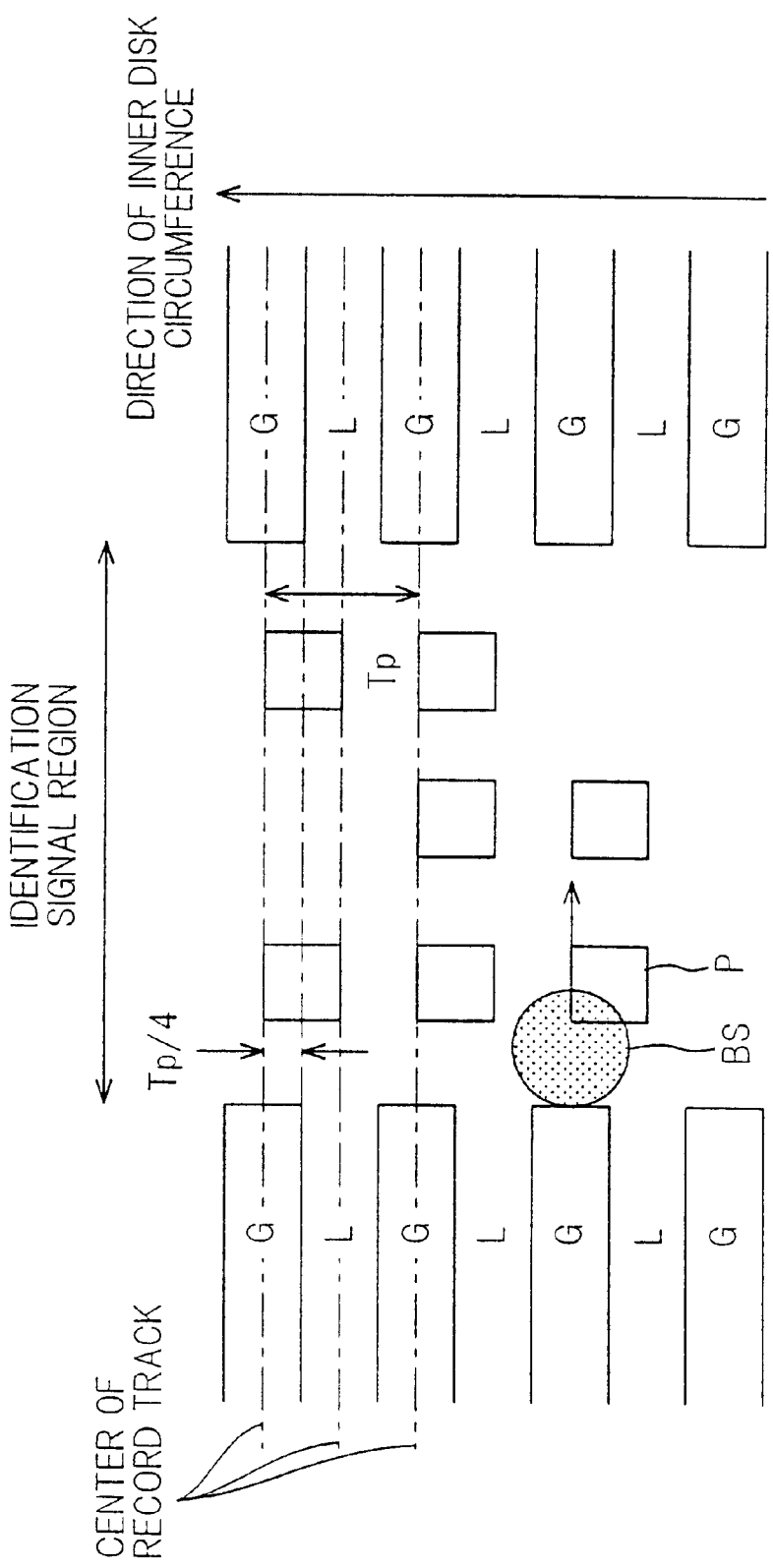
FIG. 1 is an enlarged partial plan view showing the format of the conventional optical disk.

The preferred embodiments of the invention will be explained below, referring to the drawings.

Here, (1,7)RLL is used as a modulation system and mark edge recording are used as a recording system. As the control system for the rotation of optical disk, ZCLV (zoned constant linear velocity) is used. In this embodiment, taken as an example of optical disk allowing the recording/playback is a phase change (PC) type optical disk that the recording is conducted according to the change of real reflectivity. Also, for example, a focused beam diameter $(1/e^2)$ is 0.95 μm, and each track width of land/groove is 0.58 μm.

First, an optical disk according to the invention is explained below.

Figure 3:
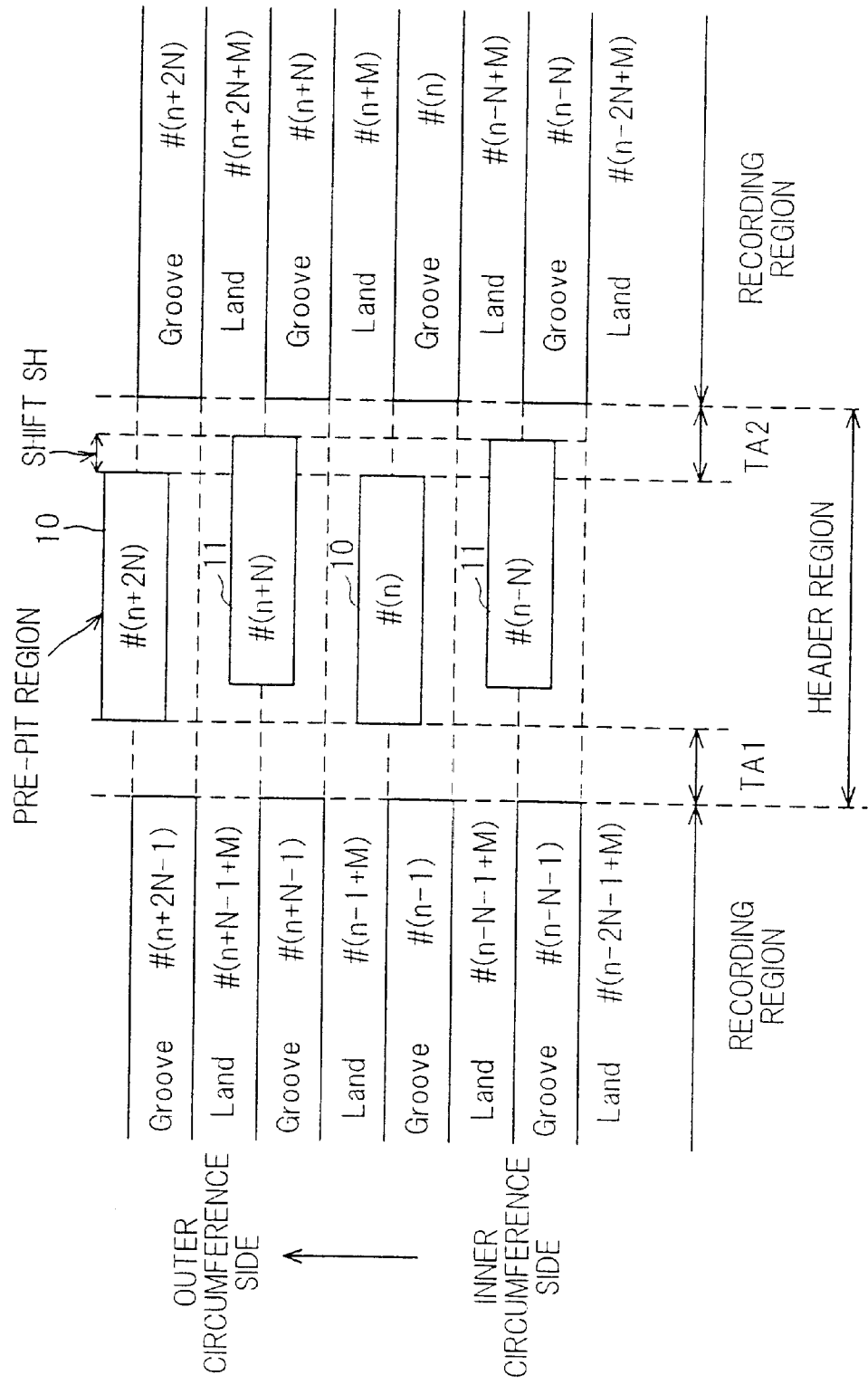
FIG. 3 is an enlarged partial plan view showing the format of an optical disk in a first preferred embodiment according to the invention.

FIG. 3 is an enlarged plan view showing the recording surface of an optical disk in the first preferred embodiment according to the invention. As shown, a header region is placed between recording regions in the scanning direction of a light beam to scan each land region (Land) as a convex part of an optical disk and each groove region (Groove) as a concave part adjacent to the land region, i.e., in the circumferential direction of the optical disk. In the header region and on the boundary part between each of the land regions (Lands) and the groove regions (Grooves), pre-pit regions that show physical address information common to a land region (Land) and a groove region (Groove) are disposed at every other boundary part. Namely, the pre-pit regions are disposed deviating by Tp/4 at every other boundary part with respect to a track pitch Tp of the land region or groove region. This arrangement is similar to that in the conventional optical disk. To ensure that a pre-pit region in a header region neighboring in the radial direction of the optical disk is not aligned, in the radial direction, with a pre-pit region on a neighboring boundary part, one of the neighboring pre-pit regions is alternately shifted by several bytes, for example, backward or forward in the circumferential direction of the optical disk. Also, it is, of course, applicable to shift the pre-pit region alternately forward and backward in each sector in the circumferential direction so that adjacent pre-pit regions are not aligned in the radial direction.

Here, an amount SH of the shifting described above in the pre-pit region is explained below.

Figure 4:
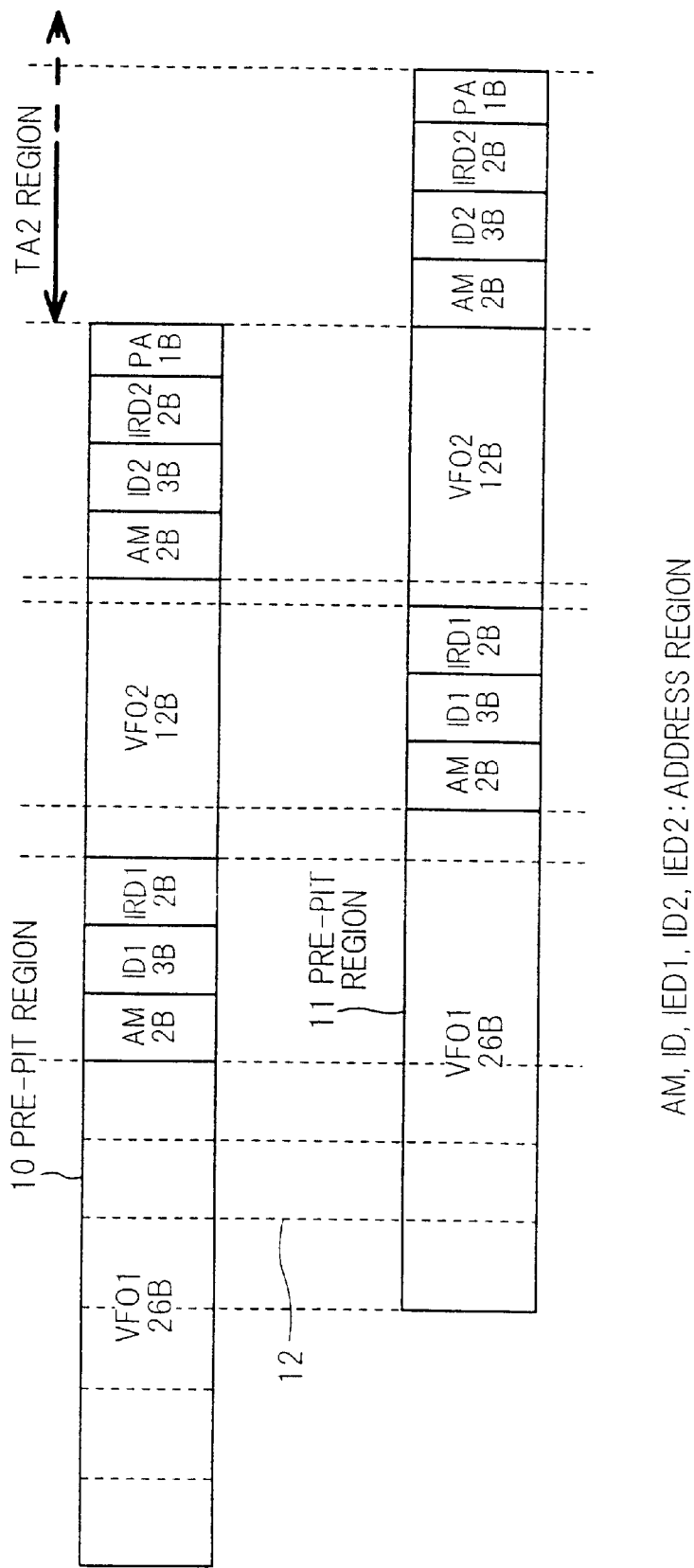
FIG. 4 is an illustration showing an example of the sector format of optical disk according to the invention.

FIG. 4 shows a format composition of the pre-pit. In FIG. 4, of the several pre-pits shown in FIG. 3, two pre-pit regions 10, 11 neighboring in the radial direction are shown. Each of these pre-pit regions 10, 11 includes a composition with doubled sector address information regions. In each pre-pit region 10, 11, to perform the doubled sector address information regions, there are provided two sets of address marks AM (2B: 2 byte), sector addresses ID1, ID2 (3B), and error correction codes IED1 (2B) of ID1, ID2. Also, there are provided VFO1 (variable frequency oscillator) (26B) before the sector address information region, and VFO2 (12B) between the sector address information regions. These regions, VFO1 and VFO2, are for the pull-in of clock, and use single-cycle signals, such as a 3T mark. Meanwhile, at the end of the pre-pit region, post-amble region PA (1B) is provided as a modulation encoding.

In this case, the shift amount SH is set so that the two sector address information regions in one of the adjacent pre-pit regions, e.g. the pre-pit region 11, are aligned to the regions, VFO1 and VFO2, of the other pre-pit region 10. Also, by the shift amount SH, the sector address information regions in the other pre-pit region are aligned to the regions, VFO1 and VFO2, of the one pre-pit region in the radius direction. Meanwhile, given blank regions, TA1 and TA2 which are formed as mirror regions, are provided at both sides of each pre-pit region in the circumference direction and between the pre-pit region and the recording region in the header region. These are also needed to give a transfer time to a cutting device to make a pre-format when moving light beam by Tp/4 in the radius direction in case of one-beam cutting device. However, the main object is to facilitate the detection of header region by forming TA1 and TA2 as mirror regions.

In conducting the recording/playback of information by scanning laser light onto the optical disk, defocusing or radial tilting, described earlier in prior art, to one pre-pit region as a scan target may occur. However, the adjacent pre-pit region, as a crosstalk component, to the sector address information is VFO1 and VFO2 regions, where 3T marks, which are of short-mark signal, are carved and the mark width is physically smaller than sector address ID1 or ID2, unless making a special artifice by the cutting device. Therefore, even for defocusing of about ±1 μm, the crosstalk is less than −26 dB, which is a tolerance of optical disk device. Also, since the VFO1 and VFO2 regions are of single-cycle mark and the identification of crosstalk component is therefore clear, a method of removing the crosstalk described later is also applicable. Thus, by shifting by the shift amount SH the neighboring pre-pit region in the header region, the harmful effect of crosstalk can be reduced significantly without reducing the format efficiency.

Even when the composition of the pre-pit region described above is employed, for a narrower track pitch Tp to provide a higher-density medium, the VFOs in the neighboring pre-pit regions may interfere with each other, affecting the identification of data when the crosstalk occurs due to defocusing. In this case, as shown in FIG. 4, at least the mutual recording mark edges 12 of the VFO1 regions in the neighboring pre-pit regions only have to be formed aligned in the radius direction. Thus, by aligning the recording mark edges in the radius direction, the interference between the VFOs in the neighboring pre-pit regions can be suppressed.

Meanwhile, as to the VFO2 region, depending on the length of AM, ID1 and IED1, the recording mark edges may not be aligned in the radius direction. However, in the VFO2 region, when conducting only the pull-in of phase using PLL (phase lock loop) circuit (not shown) for the extraction of playback clock, the problem caused by that the recording mark edges are not aligned in the radius direction does not occur since the phase lock can be obtained by a few clocks. Also, though not shown, in order to align certainly the recording mark edge of VFO2 region in the radius direction, it is applicable that a mirror region of several channel clocks is, for example, inserted between the IED1 and VFO2 in the adjacent pre-pit region 11 to be shifted. In this case, although the length of pre-pit region differs between the adjacent pre-pit regions, the VFO regions do not interfere with each other even for a further high-density medium, and the extraction of clock can be made stable. In this embodiment the pre-pit region is of the doubled composition, but it can be simplified by using a singled composition. Also, a tripled or quadrupled composition is applicable similarly.

Figure 5:
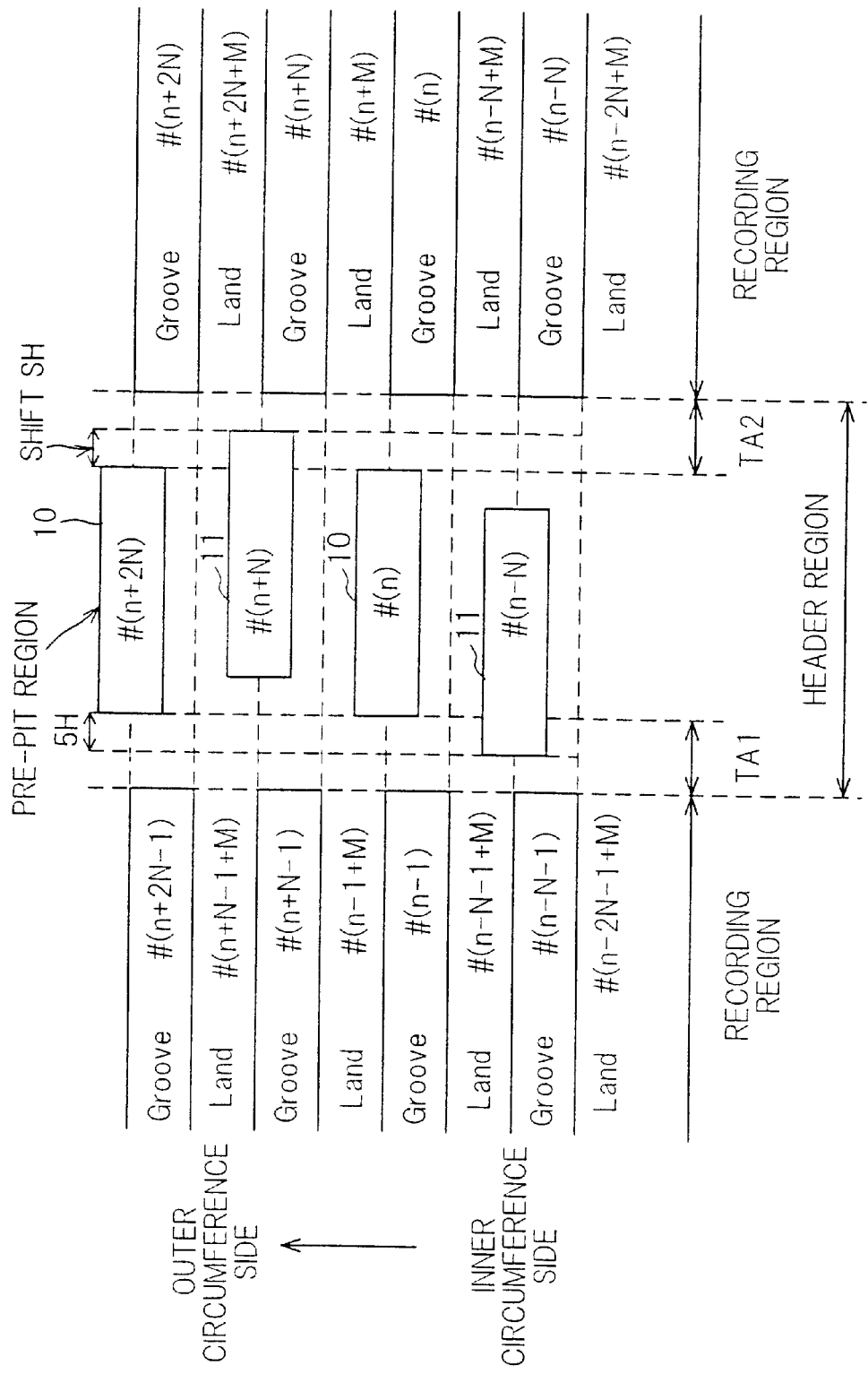
FIG. 5 is an enlarged partial plan view showing the format of an optical disk in a second preferred embodiment according to the invention.

FIG. 5 is an enlarged plan view showing the recording surface of an optical disk in the second preferred embodiment according to the invention. The difference from the optical disk in FIG. 3 is that in order not to align neighboring pre-pit regions in the radius direction, the pre-pit regions are shifted alternately, for example, forward and backward in the circumference direction of the optical disk, in the radius direction. Of course, there exist some variations other than this. For example, for a predetermined number of tracks, the alternate shifting is made forward, and for another predetermined number of tracks, the alternate shifting is made backward. Although in FIG. 5 the shift amount SH is the same value between the forward and backward sides, it may be different values therebetween. In any case, provided in this invention is an optical disk that specific information's of neighboring pre-pit regions are not aligned in the radius direction to so as to reduce the harmful effect of crosstalk.

Also, the concept of the sector structure including a sector address as fundamentals of disk format is that the sector address number of each sector, which is common physical address information to land region 1 and groove region 2, increases sequentially, n, n+1, n+2, n+3, . . . , where n is a positive integer, in the trace direction of focused beam. Herein, the trace direction shown is clockwise from the inner circumference side to the outer circumference side, and address information shown is formed in reference to the groove region. Also, N is the number of sectors in one physical track, and is a fixed number in case of ZCLV. N is an arbitrary offset number given by an address calculation circuit described after, which is used, for example, to facilitate the address management of land region and groove region. For example, M is a fixed value on the entire surface of disk.

Meanwhile, in the above embodiments, the entire pre-pit region is shifted alternately in the radius direction of optical disk. So, the lengths of TA1 and TA2 vary between neighboring pre-pit regions in the radius direction of optical disk. However, as defined in appended claims, the essential feature of optical disk according to the invention is that sector address regions are not aligned in the radius direction of optical disk. Namely, another embodiment can be, for example, composed so that the lengths of TA1 and TA2 are fixed always and only the address region is shifted by an amount of SH. In this case, the length of VFO1 varies between neighboring pre-pits. Also, when the address region after VFO2 is shifted forward, a short mark sequence, such as a VFO mark, can be inserted additionally.

Also, though not shown, the pre-pit in the header region has a shape of concave/convex and a depth or height of $\lambda/10n$ to $\lambda/4n$, where $\lambda$ is a wavelength of light beam and n is mainly a refractive index of substrate. In fact, when making a initial disk, the physical depth is determined by a thickness of resist unless making a special artifice. Therefore, if the depth or height of groove is made $\lambda/8n$, the depth or height of pre-pit becomes equal. Hereupon, though the amplitude of track error signal by push-pull system becomes maximum, the modulation degree of pre-pit reduces to less than the maximum bit depth, $\lambda/4n$. Of course, it is well known that this depends on the detection system of track error signal. In an error detection system such as heterodyne, the amplitude of track error signal becomes maximum at $\lambda/4n$. Therefore, when using the push-pull system, the pit depth is set to be, e.g. $\lambda/6n$ as a compromise point. Of course, when using a phase change type optical disk medium, the groove depth is also a compromise point considering a crosstalk in the recording region, but it is proved that a good playback performance is obtained even when setting about 70 nm nearly corresponding to a groove depth of $\lambda/6$ n.

Further, as to the shape of pre-pit in the header region, the pre-pit needs to have a width equal to or less than the track width of land/groove. For example, for a focused beam of 0.95 $\mu$m and a track width of about 1.58 $\mu$m, even under the condition that an external factor such as defocusing and radial tilting does not exist, the amount of crosstalk from the adjacent header region is such a degree that slightly exceeds a tolerance of device −26 dB. Therefore, considering the viewpoint of crosstalk, the width of pre-pit is to be determined taking the SN ratio of address information identification into account while keeping less than the track width.

Also, in dividing the surface of optical disk into multiple zones, when the zone with is made uniform, the length of the shortest recording mark within the zone is shorter at the inner circumference side and longer at the outer circumference side. Thus, the length of the shortest recording mark on the surface of optical disk must be dispersed among the zones. If the length of the shortest recording mark is short, a playback error is likely to occur and there may occur a difference in playback performance of address information in the header region among the zones. It is undesirable in the sight of reliability of disk. To avoid this as far as possible, the number of track provided for the zones at the inner and outer circumference sides are reduced so that the length of the shortest recording mark is almost uniform among the zones. According to this, there is an effect that dispersion in playback performance or recording performance among the zones becomes difficult to incur.

Figure 2:
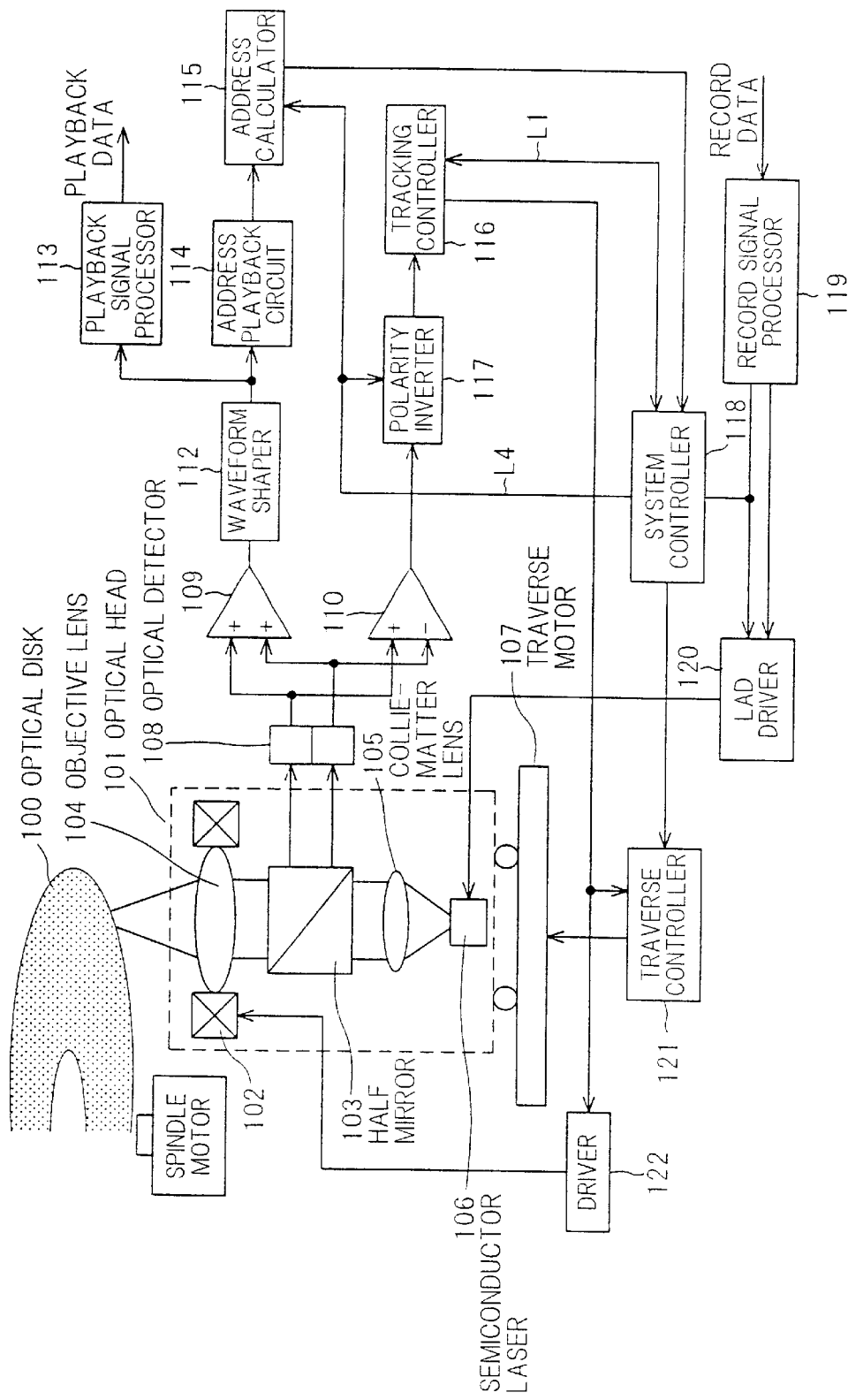
FIG. 2 is a block diagram showing the composition of the conventional optical disk device.

Next, an optical disk device according to the invention is explained. Meanwhile, in the embodiments below, the composition of the conventional optical disk device shown in FIG. 2 is incorporated into the background of this invention, and components different from the conventional disk device are shown and explained mainly.

Figure 6:
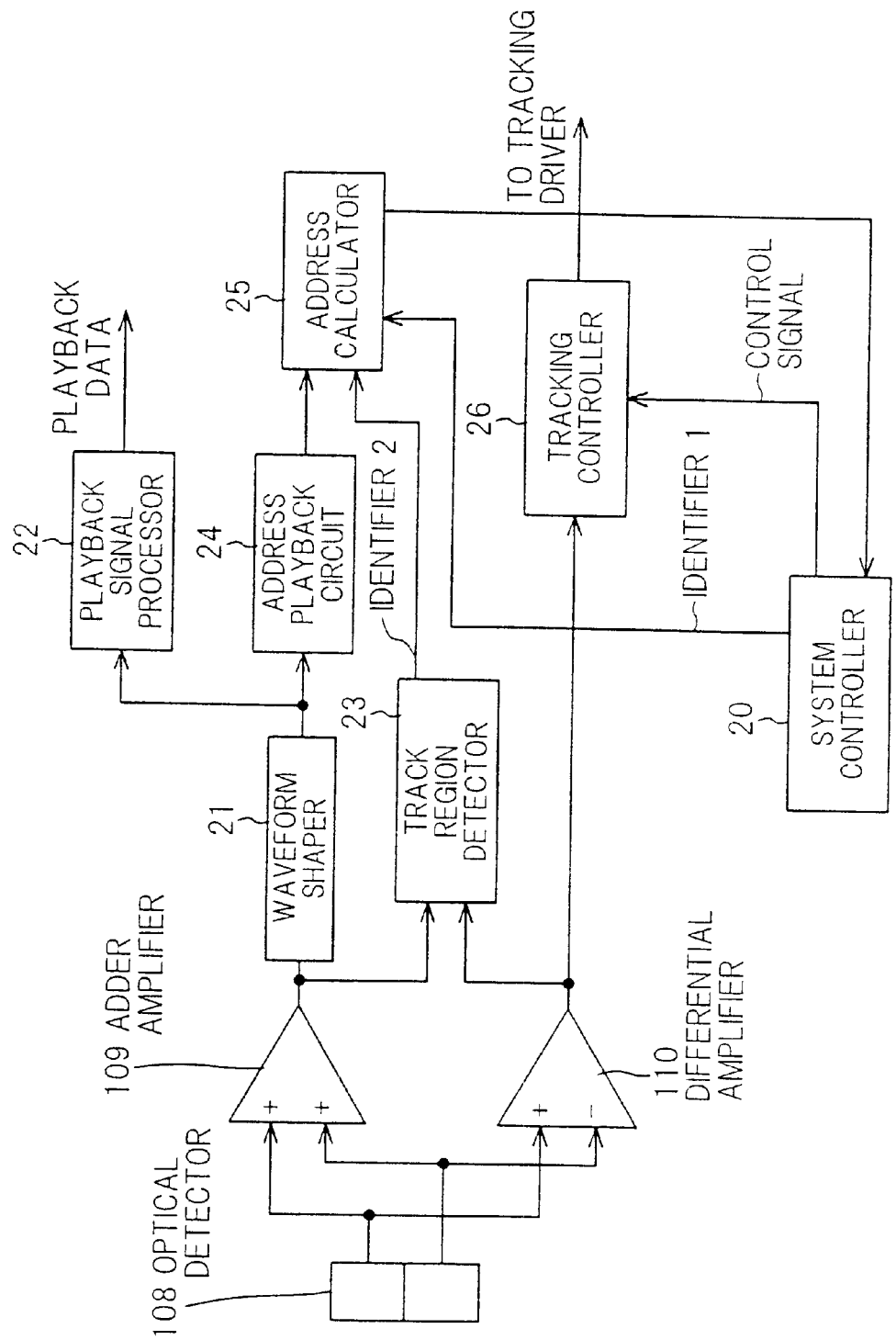
FIG. 6 is a block diagram showing main part of an optical disk device in a first preferred embodiment according to the invention.

FIG. 6 is a block diagram showing the main part of an optical disk device in the first preferred embodiment according to the invention.

The optical disk device for conducting the recording/playback of an optical disk that includes a header region having a pre-pit region that is formed on the boundary part of neighboring land region and groove region and includes address information, the header region being disposed every other boundary part, as shown in FIGS. 3 and 5, comprising: a system controller 20 as means for outputting, in advance, identifier 1 to inform whether a recording track to be scanned by light beam is a land region or a groove region; a waveform shaper 21 and an address playback circuit 24 as a physical address information extraction means for extracting physical address information of a header region to be scanned by light beam; a track region detector 23 as means for outputting identifier 2 to inform the detection result as to whether a recording track to be scanned by light beam is a land region or a groove region; and an address calculator 25 as means for calculating address from identifier 1, identifier 2 and output of the physical address information extraction means, wherein header information is shared by neighboring groove and land.

Namely, since the conventional optical disk device described in Japanese patent No. 2,663,817 conducts the address calculation using only identifier 1 (=L4 in '817) in this embodiment, a misidentification of address may occur due to the malfunction of optical disk device. So, this invention solves this problem by adding identification 2 as output of the track region detector 23.

Figure 7:
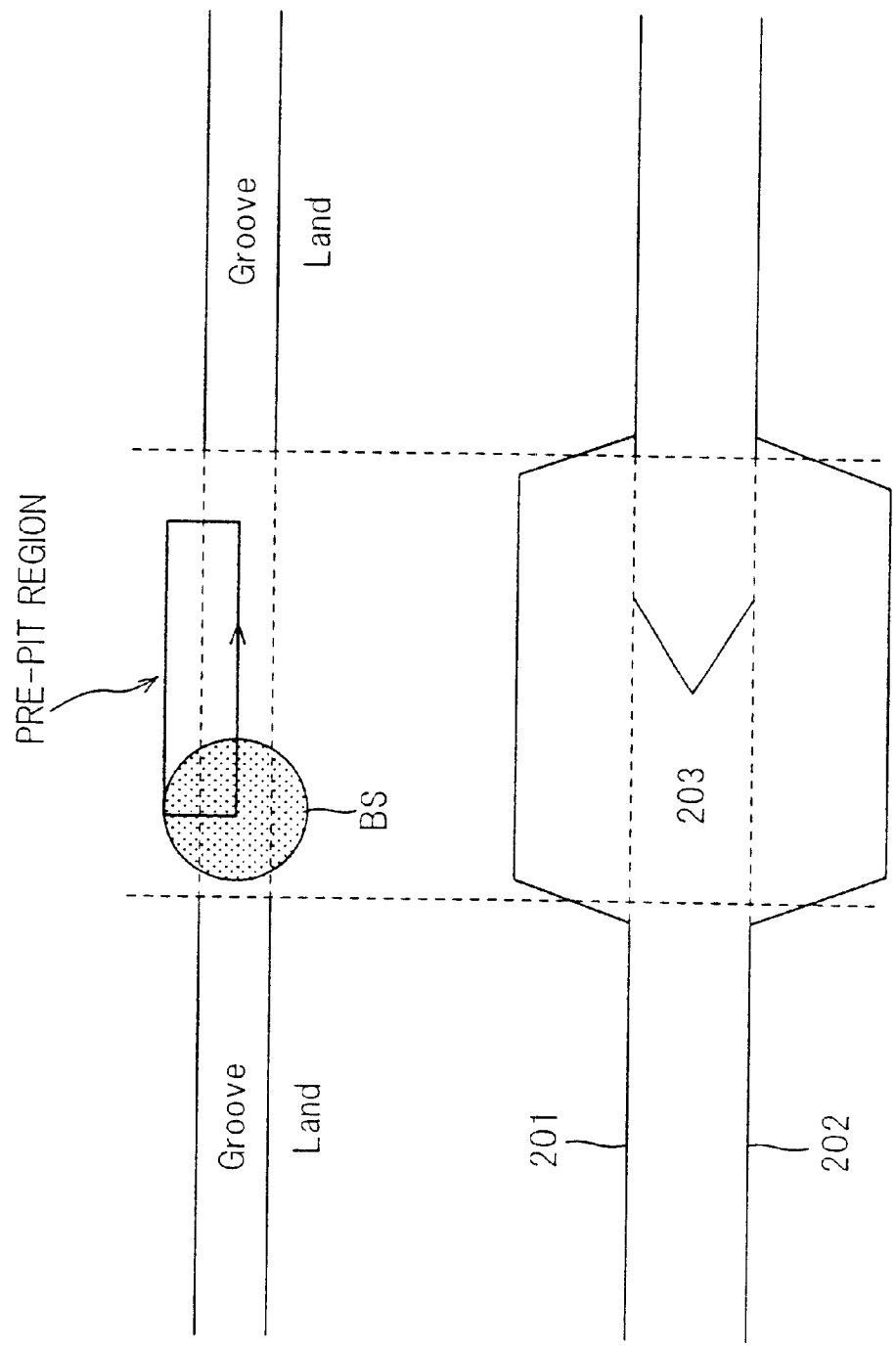
FIG. 7 is an illustration showing the idea of track error offset signal generated at the header region.

When scanning a land region (Land) or a groove region (Groove) as shown in FIG. 7, low-frequency component signal of header region superposed on track error signal gives a waveform that deviates, like 201 or 202, in the positive or negative side from the center 203 of track error signal. So, the track region detector 23 detects such positive or negative signal, binarizing this, thereby allowing the track detection which to detect a land region or a groove region to be obtained as binarized signal "1" or "0". The logical operation between this binarized signal used as identifier 2 and identifier 1 generated from the system controller 23 is conducted by the address calculator 25 composed of, e.g. an EXOR logical circuit. This allows the coincidence detection between a land or groove region designated and a land or groove region detected. Therefore, the misidentification of address caused by the malfunction of optical disk device can be prevented effectively.

Meanwhile, with played-back address information from the address playback circuit 24, the read-out address information may be used unalteredly for groove region, or the linear conversion of address may be conducted based on a conversion table for land region.

Also, when not coinciding in the coincidence detection, the re-reading of a target address can be conducted by a device operation including a retrying.

Also, even when a malfunction of device such as tracking error occur, the device can be prevented from incurring a runaway such as misidentification of address. Thus, neighboring groove and land can share header information at a good reliability.

Figure 8:
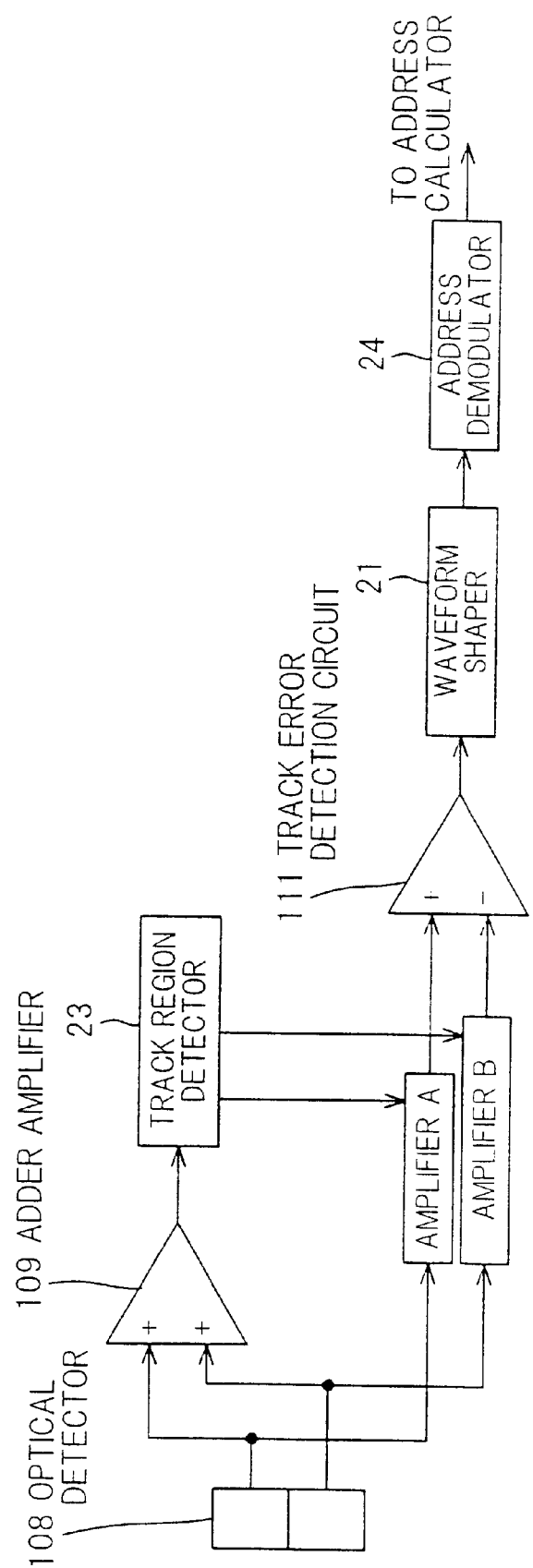
FIG. 8 is a block diagram showing main part of an optical disk device in a second preferred embodiment according to the invention.

FIG. 8 is a block diagram showing the main part of an optical disk device in the second preferred embodiment according to the invention.

Like the composition in FIG. 6 (first embodiment), also used is the track region detector 23 for judging whether a recording track to be scanned by light beam is a land region or a groove region, for an optical disk that includes a header region having a pre-pit region that is formed on the boundary part of neighboring land region and groove region and includes address information, the header region being disposed every other boundary part, as shown in FIGS. 3 and 5.

In this embodiment, amplifiers A, B and a track error detection circuit 111 are additionally provided as means for calculating address information by outputting push-pull signal by changing the output ratio of one signal and other signal from the division type optical detector 108, which detects push-pull signal, based on the output of track region detector 23.

The conventional optical disk device described in Japanese patent No. 2,663,817 conducts the playback of address information using wide-band push-pull signal. However, in case of the optical disk above, since half of light beam is projected on the pre-pit, there is a difference between amounts of signal received by the two optical detectors 108 divided to obtain push-pull signal. Therefore, in the conventional optical disk device, for push-pull signal as difference signal of the optical detectors, its in-phase component noise is not cancelled and its waveform is distorted. Especially when defocusing occurs, it is significant on the header side where crosstalk occurs.

In contrast with this, in the second embodiment of the invention, the circuit is composed so that push-pull signal, as difference signal, with the amplitude ratio between one signal output and other signal output changed from 1:1 is output. Thereby, stable push-pull signal with a good SN ratio can be obtained.

Namely, in this optical disk device, signals from the division type optical detector 108 pass through the amplifiers A and B whose amplification degree can be set by external signal, then outputting difference signal of both the signals from the track error detection circuit 111. For example, according to the output of the track region detector 23, the amplification degree of the amplifier A to the amplifier B is set, e.g., 1.2 times for land region, and the amplification degree of the amplifier B to the amplifier A is set, e.g., 1.2 times for groove region. Therefore, the in-phase component noise of push-pull signal becomes equal and the distortion of waveform can be prevented. Of course, when the amplification degree is set to be zero at only one side, the detection of signal is conducted at only other side.

After that, the good push-pull signal output is binarized by the waveform shaper 21, and then address information is demodulated by the address playback circuit 24. Although not shown, the address information is calculated, with identifiers 1 and 2, by the address calculator in the same composition as shown in FIG. 6.

Figure 9:
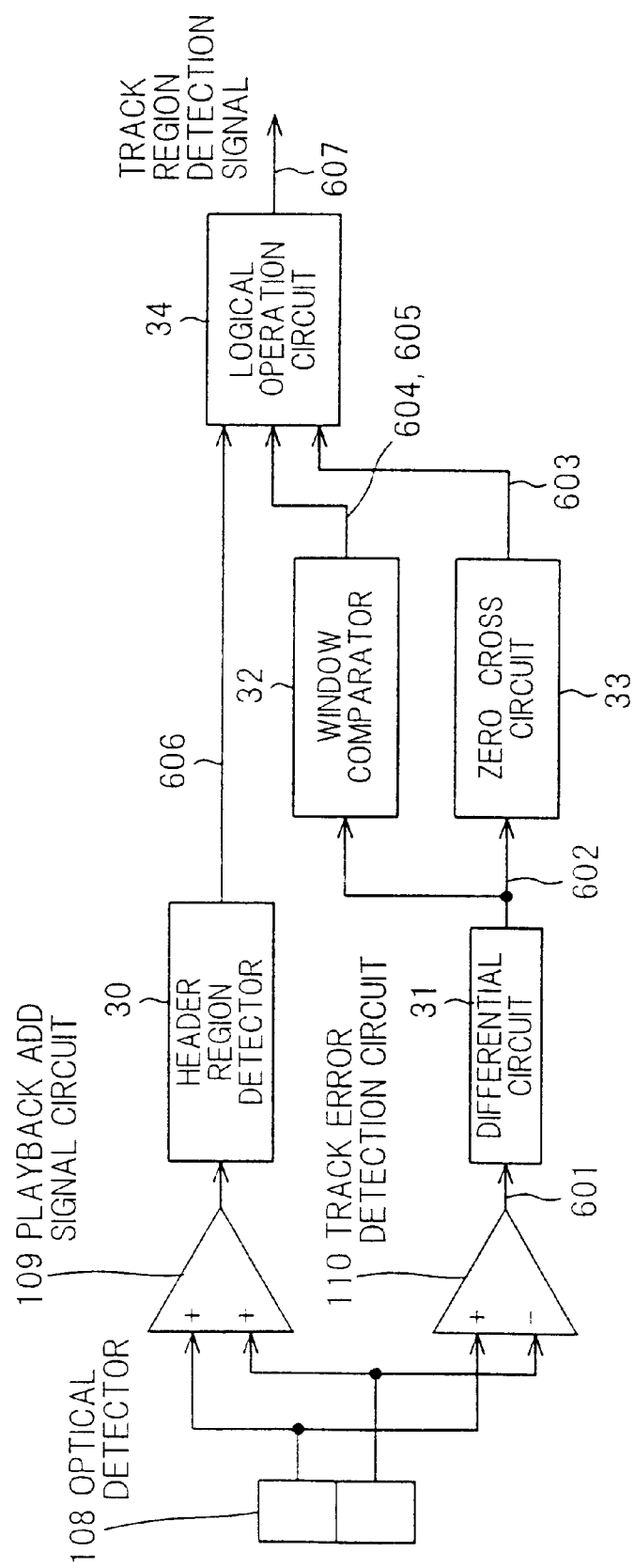
FIG. 9 is a block diagram showing main part of an optical disk device in a third preferred embodiment according to the invention.
Figure 10:
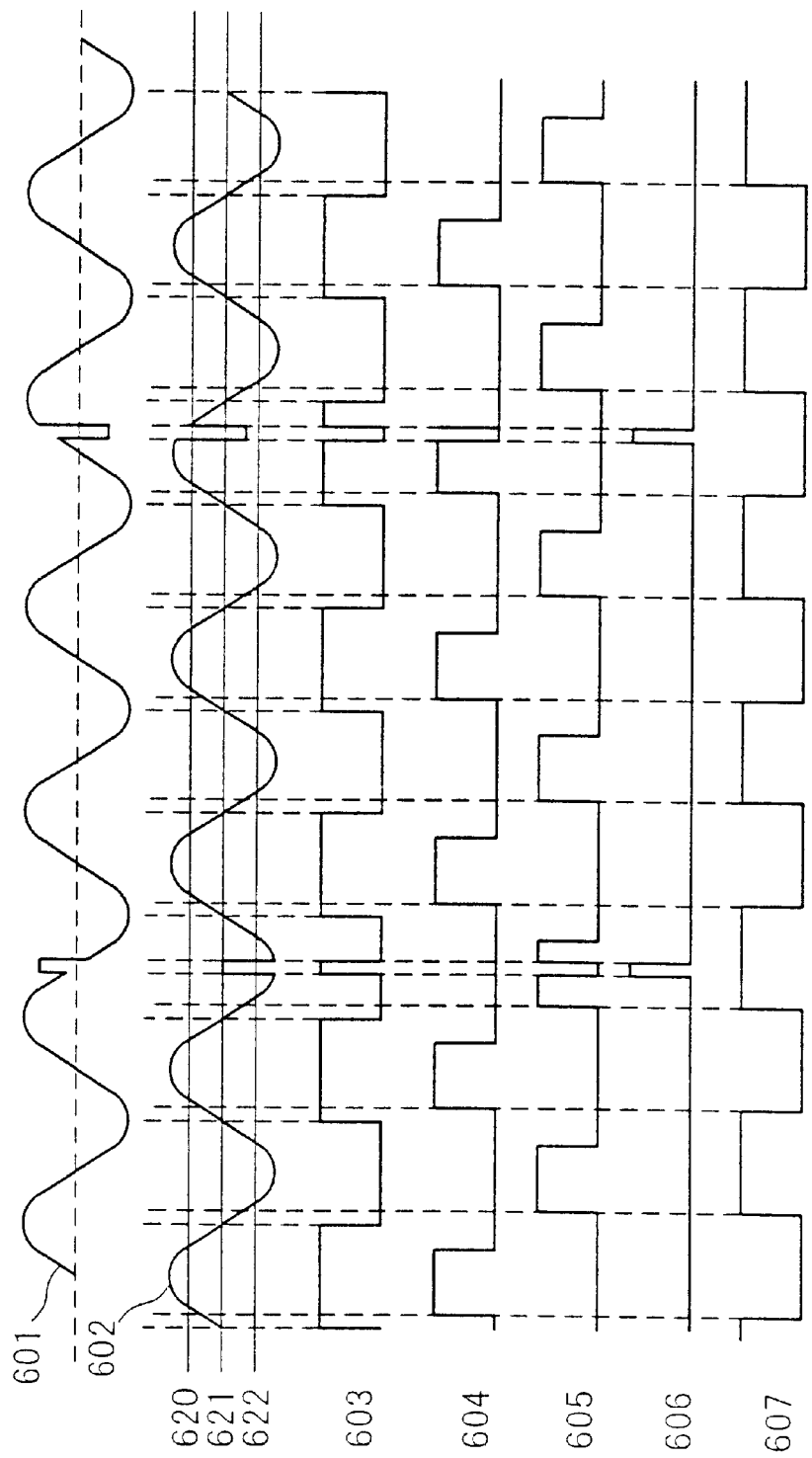
FIG. 10 is a waveform diagram showing the operation of the optical disk device in FIG. 9.

FIG. 9 is a block diagram showing the main part of an optical disk device in the third preferred embodiment according to the invention. FIG. 10 is a signal waveform diagram showing the operation of the optical disk device.

Like the optical disk device described in Japanese patent No. 2,663,817, also used is the playback add signal circuit 109 to output track add signal, and the track error detection circuit 110 to output track error signal 601 as wide-band push-pull signal, which is track difference signal, in the optical disk device for an optical disk that includes a header region having a pre-pit region that is formed on the boundary part of neighboring land region and groove region and includes address information, the header region being disposed every other boundary part, as shown in FIGS. 3 and 5.

In this embodiment, additionally provided are a header region detector 30 to output header region signal 606 for indicating a header region position based on the track add signal, a differential circuit 31 to output first-order differential signal 602 based on track error signal 601, a zero cross circuit 33 to output differential cross signal 603 which is zero cross signal of the first-order differential signal 602, a window comparator 32 to binarize the first-order differential signal 602 by two predetermined positive and negative slice levels 620, 622 to an amplitude center level 621, and a logical operation circuit 34 to output track region detection signal 607 to determine whether a track scanned by light beam is a land region or a groove region, from the header region signal 606, the differential cross signal 603 and the window comparator's output signals 604, 605.

The logical operation circuit 34, which is composed of, e.g. RS flip-flop circuit, receives differential cross signal 603 as data input, latching this using the rising edges of window comparator's output signals 604, 605 as set signal and reset signal, respectively, passing through a polarity inversion circuit, outputting the track region detection signal (land/groove signal) 607. Herein, the land region is output as "1" and the groove region is output as "0". Thus, of header region signals 606 in FIG. 10, the forward header position corresponds to a header region viewed from the land region, and the backward header position corresponds to a header region viewed from the groove region.

Figure 11:
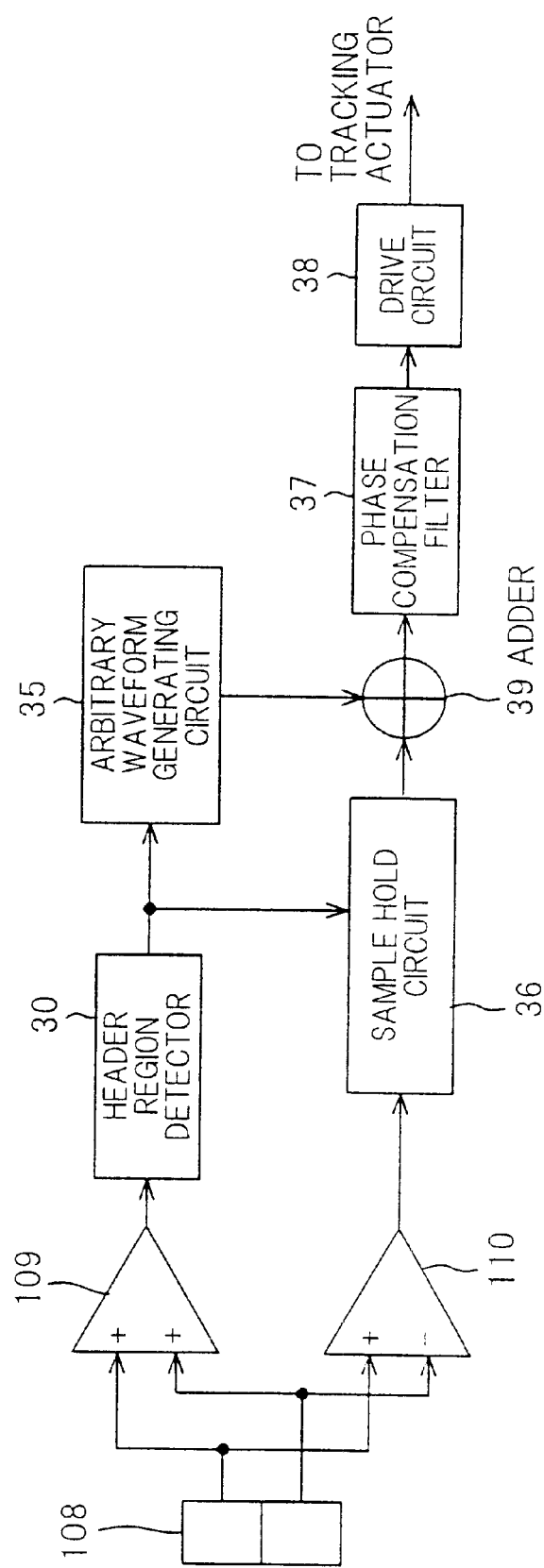
FIG. 11 is a block diagram showing main part of an optical disk device in a fourth preferred embodiment according to the invention.

FIG. 11 is a block diagram showing the main part of an optical disk device in the fourth preferred embodiment according to the invention.

This embodiment is applied to an optical disk device for an optical disk that includes a header region having a pre-pit region that is formed on the boundary part of neighboring land region and groove region and includes address information, the header region being disposed every other boundary part, as shown in FIGS. 3 and 5.

Like the optical disk device in FIG. 9, also provided is the header region detector 30 to detect the header region. In this embodiment, additionally provided are a sample a hold circuit 36 to sample a track error signal value at an arbitrary time before the output time of the header region detector 30 and to hold it for an arbitrary time, an arbitrary waveform generating circuit 35 to generate arbitrary waveform signal, and an adder circuit 39 to add either or both of output signal of the sample hold circuit 36 and control signal from the system controller (its signal output is not shown). Further provided is a phase compensation filter 37 to output desired servo error signal based on servo error signal output from the adder circuit 39, and a drive circuit 38 to drive the tracking actuator according to the servo error signal from the phase compensation filter 37. Also, as part of control signal from the system controller (not shown), write gate signal (WGATE), which is gate signal for the start of recording, may be used to control the add timing of arbitrary function. Alternatively, it may be added always.

As shown in FIG. 7, when light beam scans the header region, though the size and sign vary depending on the land region scanning or groove region scanning, the track error signal 201 or 202 incurs a large offset. This is because the header region is shifted by nearly half pitch from the land or groove region where light beam scans and therefore a low-frequency component of the header region superposed on track error signal as push-pull signal causes a track offset. Because of this, track error signal after passing the header region makes a transient response and, in some cases, continues making the transient response. In such a condition that the tracking control is unstable, there may occur a problem that the following header address cannot be played back and the sector recording cannot be carried out continuously.

So, in this embodiment, the unstable-tracking-control condition can be avoided by using servo error signal from the sample hold circuit 36 that uses the output of header region signal from the header region detector 30, holding a track error signal value of at least several bytes of sector format before the output time, from the finish of header region signal until just before the recording starts.

However, even in this composition, when the transfer function varies due to a deterioration of actuator system with age, the tracking control may be unstable. So, in this embodiment, further by measuring signal of track offset waveform occurring at the header region to be detected by the header region detector 30 by a previous learning etc., then, for example, subtracting this from the servo error signal in the adder circuit 39, the track follow-up performance can be stabilized. Also, other than the simple reverse function of track offset waveform, an arbitrary waveform generated by the arbitrary waveform generating circuit 35 can be added or subtracted to produce servo error signal while securing the stability of the servo control system including actuator system.

The arbitrary waveform may be, for example, a rectangular pulse with arbitrary height and width. Here, the arbitrary values may be determined taking a step response waveform of the servo system including actuator system into account. Also, they may be, of course, a DC value simply. This corresponds to the simple adding/subtracting of track offset, and, in this case, by using write gate signal (WGATE) which is gate signal for the start of recording, the timing of adding/subtracting may be controlled. Thus, the track offset can be switched between the playback and the recording. Also, the selection of signal from the arbitrary waveform generating circuit 35 can be conducted based on land/groove signal from the system controller or the track region detector, described earlier, that conducts the detection of land/groove signal to detect whether the recording track scanned by light beam is a land region or a groove region.

Meanwhile, though not shown, the arbitrary waveform generating circuit 35 is, for example, composed so that an A/D converter takes in track error signal, e.g., only near the header region for a predetermined time, accumulating it into a RAM memory, and a D/A converter converts it when outputting the signal. By this composition, the reverse function of track offset waveform can be obtained. Also, when generating a true arbitrary waveform, by providing an operation means to develop the function on a RAM memory, the signal can be output by using a D/A converter. Also, many kinds of arbitrary waveforms can be, of course, prepared in advance by the address management on RAM.

Figure 12:
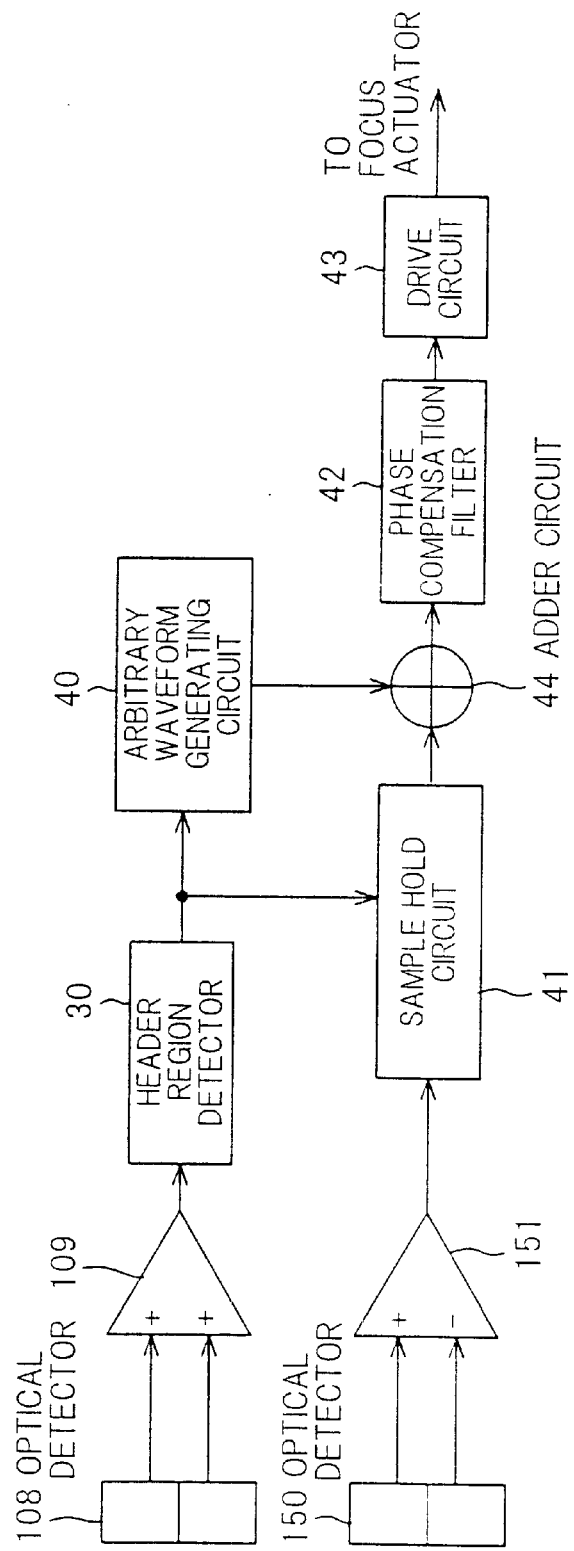
FIG. 12 is a block diagram showing main part of an optical disk device in a fifth preferred embodiment according to the invention.

FIG. 12 is a block diagram showing the main part of an optical disk device in the fifth preferred embodiment according to the invention.

This embodiment is applied to an the optical disk device for an optical disk that includes a header region having a pre-pit region that is formed on the boundary part of neighboring land region and groove region and includes address information, the header region being disposed every other boundary part, as shown in FIGS. 3 and 5.

In this embodiment, in addition to the division type optical detector 108 for the detection of track error signal, a division type optical detector 150 for the detection of focus error signal is provided.

Like the optical disk device in FIG. 11, provided in this embodiment are the header region detector 30 to detect the header region, a sample hold circuit 41 to sample a focus error signal value at an arbitrary time before the output time of the header region detector 30 and to hold it for an arbitrary time, an arbitrary waveform generating circuit 40 to generate arbitrary waveform signal, an adder circuit 44 to add either or both of output signal of the sample hold circuit 41 and control signal from the system controller (its signal output is not shown), a phase compensation filter 42 to output desired servo error signal, and a drive circuit 43 to drive the focus actuator. Also, as part of control signal from the system controller (not shown), write gate signal (WGATE), which is gate signal for the start of recording, may be used to control the add timing of arbitrary function. Alternatively, it may be added always.

Figure 13:
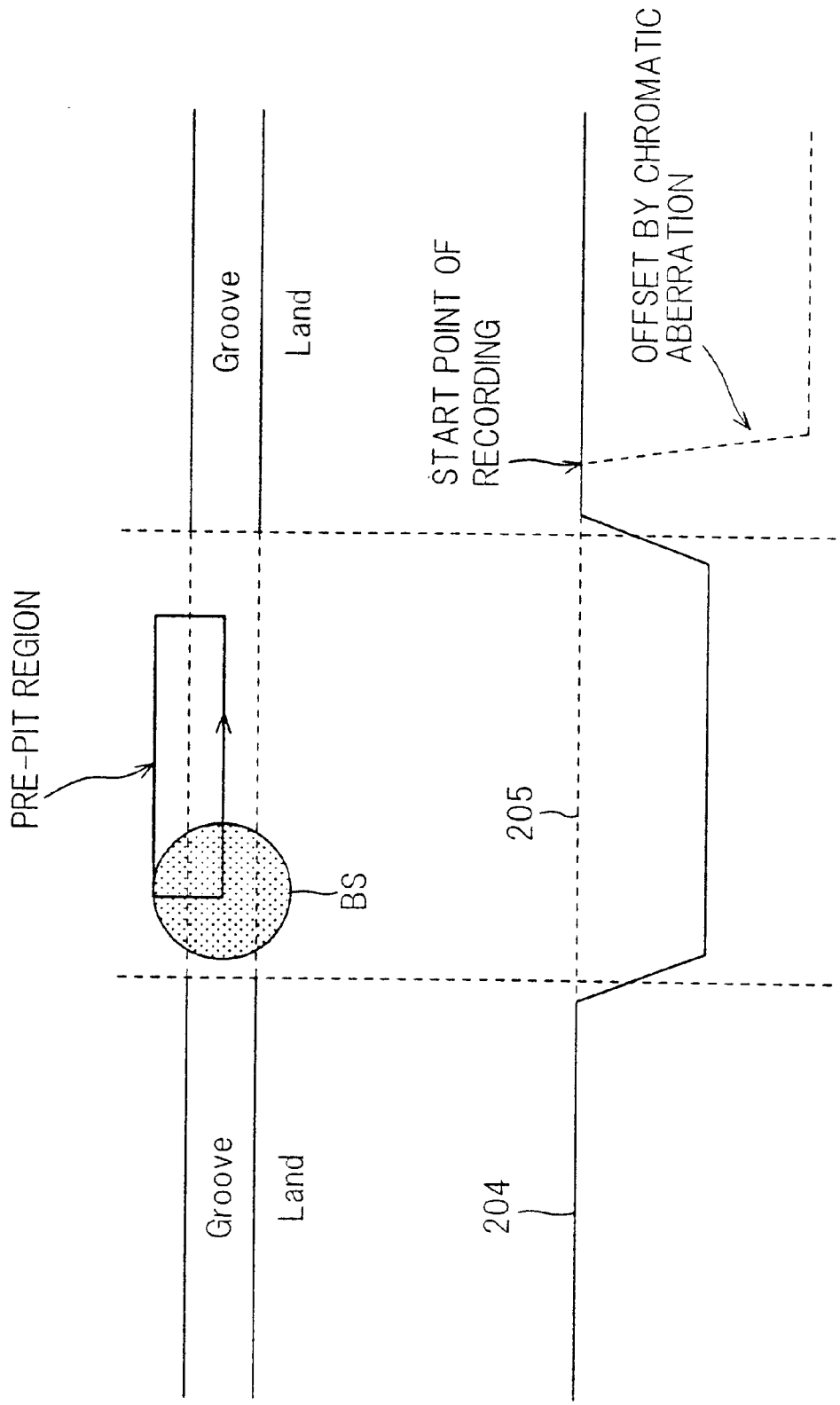
FIG. 13 is an illustration showing the idea of focus error offset signal generated at the header region.

As shown in FIG. 13, when light beam scans the header region not only track error signal but also focus error signal 204 incurs a large offset. It is assumed that this is affected by the optical turning of track error signal into focus error signal or a phase difference. Hereupon, it is apparent that excessive drive current is supplied to the actuator, thereby the focus control becomes unstable. However, the actuator itself cannot move even when an optical offset occurs at the header region. Because, to the servo control band, in general, the length of header region is not made to be long, therefore the playback of header region incurs no problem.

However, as shown in FIG. 13, when starting the recording after passing the header region, depending on the composition of optical head, there occurs a focus offset due to the chromatic aberration of objective lens, by a phenomenon called a jump of wavelength in semiconductor laser. This focus offset interferes with the focus offset occurring near the header region, thereby the focus control is made to be further unstable, causing a failure in recording.

So, in this embodiment, the unstable-focus-control condition can be avoided by using servo error signal from the sample hold circuit 41 that uses the output of header region signal from the header region detector 30, holding a focus error signal value of at least several bytes of sector format before the output time, from the finish of header region signal until just before the recording starts.

However, even in this composition, when the transfer function varies due to a deterioration of actuator system with age, the focus control may be unstable. So, in this embodiment, further by measuring signal of focus offset waveform occurring at the header region to be detected by the header region detector 30 by a previous learning etc., then subtracting this from the servo error signal in the adder circuit 44, the focus follow-up performance can be stabilized. Also, other than the simple reverse function of focus offset waveform, an arbitrary waveform generated by the arbitrary waveform generating circuit 40 can be added or subtracted to produce servo error signal while securing the stability of the servo control system including actuator system.

The arbitrary waveform may be, for example, a rectangular pulse with arbitrary height and width. Here, the arbitrary values may be determined taking a step response waveform of the servo system including actuator system into account. Also, they may be, or course, a DC value simply. This corresponds to the simple adding/subtracting of focus offset, and, in this case, by using write gate signal (WGATE) which is gate signal for the start of recording, the timing of adding/subtracting may be controlled. Thus, the focus offset can be switched between the playback and the recording.

Also, the selection of signal from the arbitrary waveform generating circuit 40 can be conducted based on land/groove signal from the system controller or the track region detector, described earlier, that conducts the detection of land/groove signal to detect whether the recording track scanned by light beam is a land region or a groove region.

Meanwhile, though not shown, the arbitrary waveform generating circuit 40 is, for example, composed so that an A/D converter takes in focus error signal, e.g., only near the header region for a predetermined time, accumulating it into a RAM memory, and a D/A converter converts it when outputting the signal. By this composition, the reverse function of focus offset waveform can be obtained. Also, when generating a true arbitrary waveform, by providing an operation means to develop the function on a RAM memory, the signal can be output by using a D/A converter.

Figure 14:
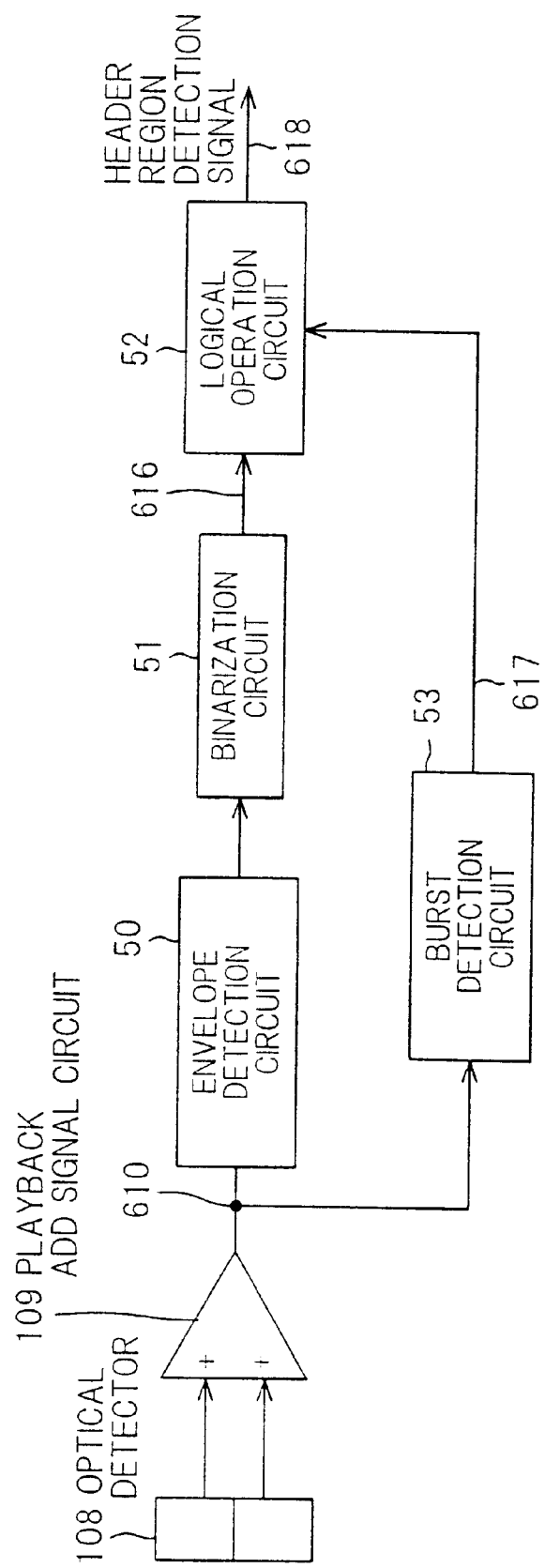
FIG. 14 is block diagram showing main part of an optical disk device in a sixth preferred embodiment according to the invention.

FIG. 14 is a block diagram showing the main part of an optical disk device in the sixth preferred embodiment according to the invention.

The optical disk device in this embodiment, which is applied to an optical disk as shown in FIGS. 3 and 5, comprises a playback add signal circuit 309 to output track add signal of the division type optical detector 108, an envelope detection circuit 50 to output the envelop signal of track add signal, a binarization circuit 51 to binarize the envelope signal, a burst detection circuit 53 to output burst detection signal from burst signal with a specific mark including the track add signal, and a logical operation circuit 52 to output header region signal, which is binarized signal almost enclosing the header region, from output signal of the binarization circuit 51 and the burst detection signal. Here, the burst signal with a specific mark is signal VFO1 of pre-pit region shown in FIG. 4, and is a single-cycle signal, such as a 3T mark.

Figure 15:
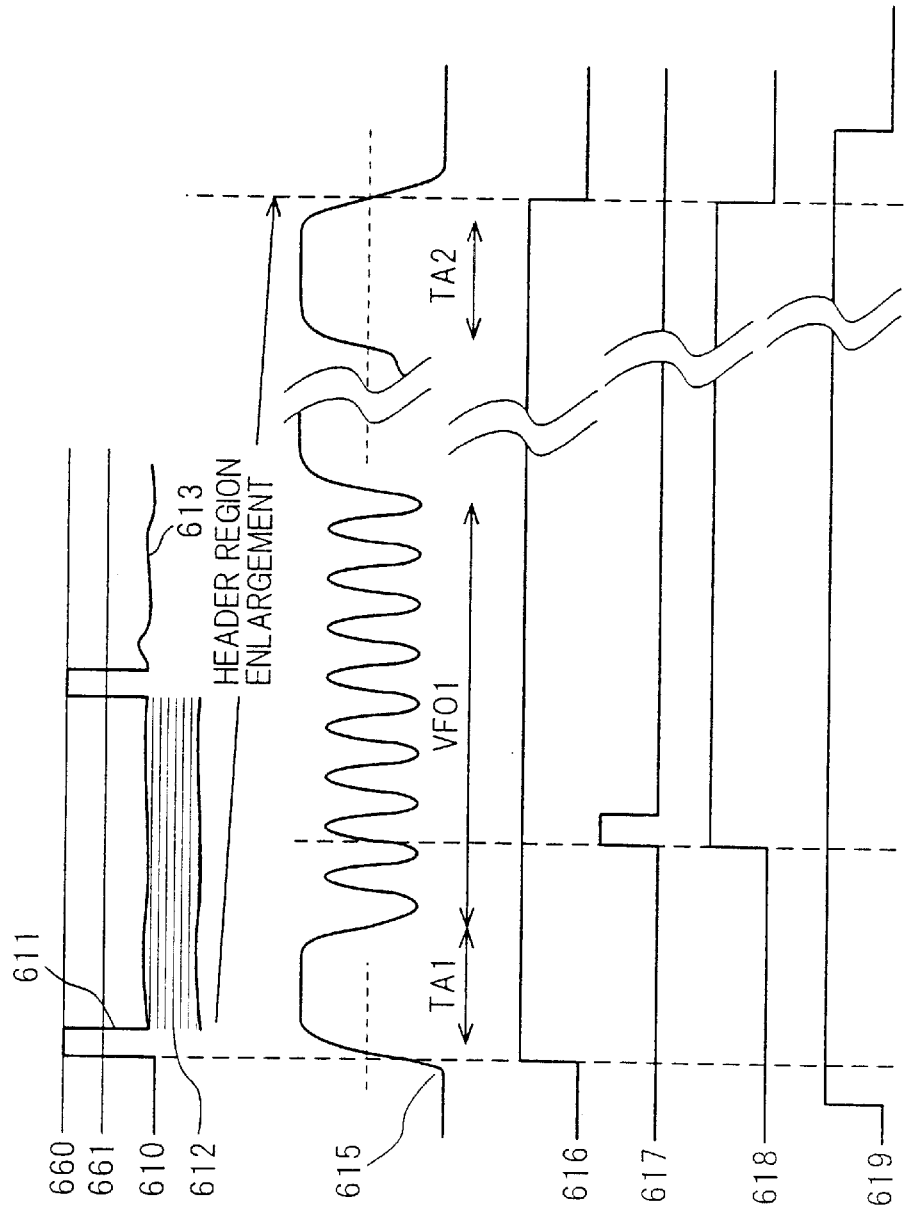
FIG. 15 is a waveform diagram showing the operation of the optical disk device in FIG. 14.

FIG. 15 is a waveform diagram showing the operation of the optical disk device in this embodiment.

610 is track add signal, 611 is signal near the header region, 612 is a recording date region, and 613 is an erase level (unrecorded level) in a phase change disk. When output level of envelop signal to the track add signal 610 is 615 and the threshold level of the binarization circuit 51 is set to be at the middle level between 615 and 613, rough header detection signal 616 is output. In this simple composition, the rough header detection signal 616 must be output even for a defect or dust in optical disk.

To solve this problem, burst detection signal 617 in VFO1 region is detected by the burst detection circuit 53, the rough header detection signal 616 is subject to a logical operation by the logical operation circuit 52 composed of, e.g., a flip-flop circuit, thereby header region detection signal with a good reliability can be output.

Then, the logical operation circuit 52 counts by an interval, e.g., between the header region and the following sector's header region by a byte counter circuit, thus header region signal 619, which is binarized signal almost enclosing the header region is output.

Although in this embodiment the burst signal is detected from the track add signal, it may be detected from push-pull signal, which is track difference signal.

Figure 16:
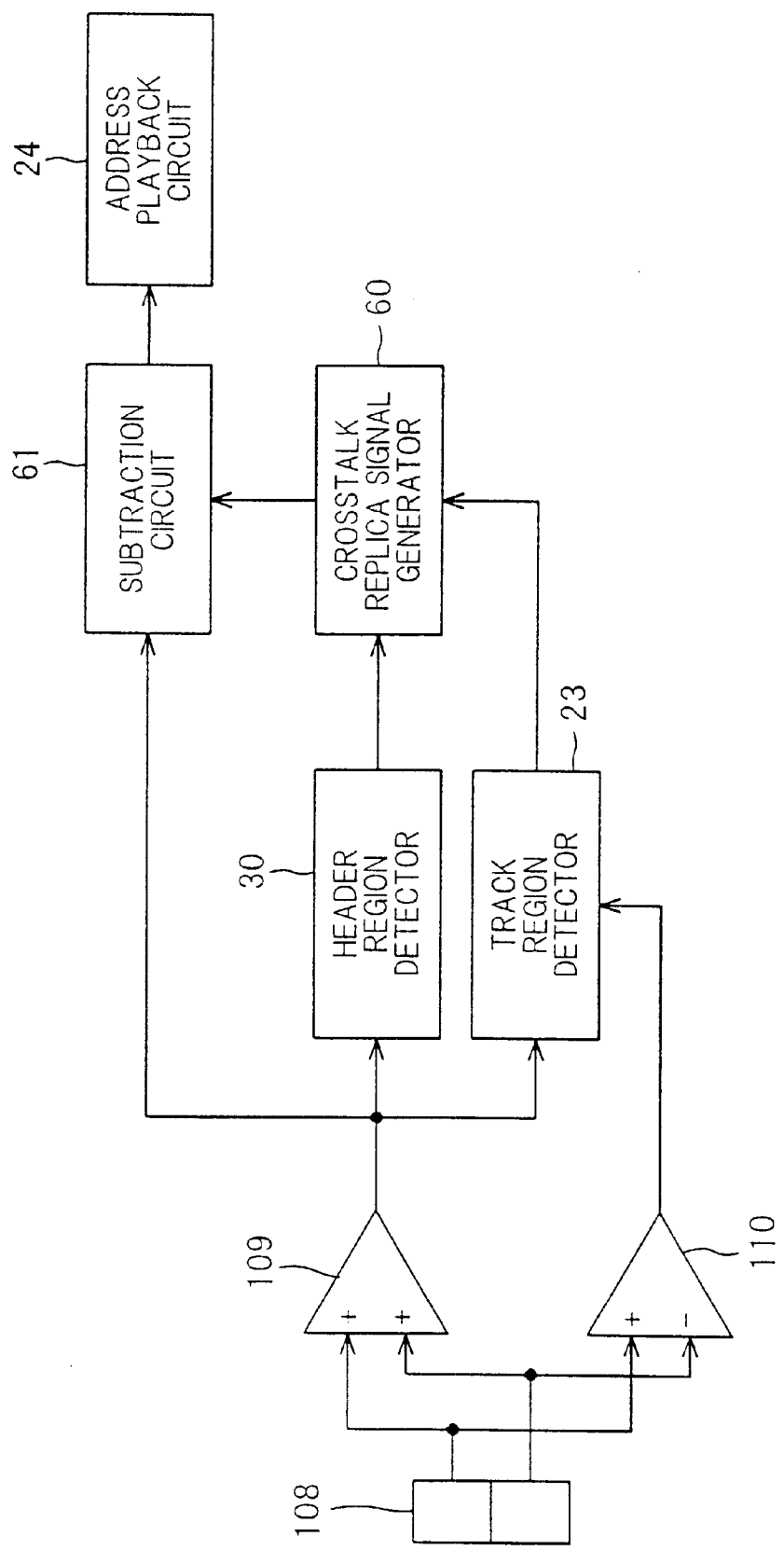
FIG. 16 is block diagram showing main part of an optical disk device in a seventh preferred embodiment according to the invention.

FIG. 16 is a block diagram showing the main part of an optical disk device in the seventh preferred embodiment according to the invention.

In an optical disk as shown in FIGS. 3 and 5, when there exists clearly a crosstalk component from then neighboring header at the position where sector address information is played back as shown in FIG. 4, crosstalk replica signal is easy to generate.

Thus, the optical disk device in this embodiment comprises a crosstalk replica signal generating circuit 60, a subtraction circuit 61 to subtract the crosstalk replica signal from the pre-pit signal component of track add signal, e.g. by using timing control signal from the system controller (not shown), and an address playback circuit 24 to play back address information from output of the subtraction circuit 61. Meanwhile, in using no timing control signal, the crosstalk replica signal may be subtracted uniformly from the pre-pit signal component only when the header region detection signal is output.

When focused beam scans a land region, the crosstalk replica signal generating circuit 60 generates a replica of pre-pit playback signal with 3T mark so as to remove a crosstalk component from VFO2 in the neighboring pre-pit region, generating crosstalk replica signal by setting the gain ratio to the pre-pit signal component to be, e.g. 15%, taking the crosstalk amount into account.

On the other hand, when focused beam scans a groove region, it may be composed so that a crosstalk component from VFO1 of the neighboring pre-pit region can be removed. For example, the crosstalk replica signal generating circuit 60 is, like the composition of the arbitrary waveform generating circuit described earlier, composed of an operation means to develop the function on a RAM memory, where the signal is output by using a D/A converter.

Although in this embodiment the sector address information etc. is played back from the track add signal, the sector address information may be played back from push-pull signal, which is track difference signal.

Meanwhile, in the optical disk of this invention, the neighboring pre-pit regions in the header region with may have different lengths so that parts of address information in the neighboring pre-pit regions are not aligned in the radius direction.

Although a phase change type optical disk are used in the above embodiments, a magneto-optic disk and a playback-only reflection type optical disk are also applicable. Also, the optical disk devices in the above embodiments are applicable to the playback/recording of these optical disks.

Although the (1, 7) modulation system and the mark edge recording are used in the embodiments, coding of other modulation/demodulation system and a mark position recording may be used.

Although the ZCLV system for the rotation control of optical disk is used in the embodiments, a ZCAV (zoned constant angular velocity) system or a simple CAV system may be used.

Further, although in the embodiments the sector address information etc. is played back from the track add signal, the sector address information may be played back from push-pull signal, which is track difference signal.

Although in the embodiments the compositions to solve the problem of the optical disk described in Japanese patent No. 2,663,817 are disclosed, another header arrangement can be used so that parts of address information in the pre-pit regions neighboring in the radius direction are not aligned in the radius direction. For example, also applicable is a composition, which is described in Japanese patent No. 2,788,022, that pre-pits are arranged on the right and left sides of the boundary of land and groove.

Advantages of the Invention

In the optical disk of the invention, the pre-pit regions including specific information are formed at the boundary part of neighboring land region and groove region and are disposed every other boundary part, and specific information's in the neighboring pre-pit regions are not aligned in the radius direction of the optical disk. Therefore, the crosstalk effect from the neighboring pre-pit region can be suppressed. Even when defocusing of light beam occurs due to an error in the manufacturing of head or a deterioration in head performance with age, misidentification of address information in the pre-pit region can be reduced significantly. Accordingly, the reduction of throughput in the optical disk device can be prevented, thereby the reliability of device or disk can be enhanced.

On the other hand, in the conventional optical disk device, there were problems as follows: the influence of the pre-pit to servo error signal is to cause the focus offset and the disorder of track error signal, thereby incurring a unstable recording/playback. Further, when starting the recording after passing the header region, depending on the composition of optical head, there occurs a focus offset due to the chromatic aberration of objective lens, by a phenomenon called a jump of wavelength in semiconductor laser, thereby causing a failure in recording.

In contrast with this, the optical disk device of this invention can offer stable header detection and address identification. Also, the sharing of address by land and groove can be performed with a good reliability. Further, the stability of playback/recording at data region can be enhanced.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical disk device for conducting recording/playback of an optical disk comprising a plurality of land regions and a plurality of groove regions that are formed on a substrate, wherein said land regions alternate with said groove regions, wherein between each land region and the adjacent groove region there is defined a boundary, wherein each of said land regions and groove regions serves as a recording track that is the medium of a recording/playback information signal; and a plurality of pre-pit regions that are positioned at every other boundary, wherein each of said pre-pit regions includes address information, the optical device comprising:

means for outputting, in advance, a first identifier representing whether a recording track scanned by a light beam is a land region or a groove region;

a track region detection means for detecting whether said recording track scanned by the light beam is a land region or a groove region and outputting a second identifier representing a detection result;

an address information extraction means for extracting address information from said recording track scanned by the light beam; and means for conducting an address calculation based on the first identifier, the second identifer, and the address information.

2. An optical disk device, according to claim 1, wherein each of the pre-pit regions includes specific information, and wherein the specific information in one pre-pit region is not aligned in a radial direction of said optical disk with the specific information in a neighboring pre-pit region.

3. An optical disk device, according to claim 2, wherein said pre-pit regions include mirror regions that are disposed forward and backward in a circumference direction of said optical disk.

4. An optical disk device, according to claim 2, wherein a first of said pre-pit regions is shifted in a circumferential direction of said optical disk with respect to a second of said pre-pit regions, and wherein the specific information maintained in each of the first and second pre-pit regions corresponds to address information.

5. An optical disk device, according to claim 4, wherein said first and second pre-pit regions comprise:

a first group of recording tracks that are shifted forward in the circumferential direction of said optical disk; and a second group of recording tracks that are shifted backward in the circumferential direction of said optical disk, wherein said first and second groups of recording tracks are disposed alternately in the radial direction of said optical disk.

6. An optical disk device, according to claim 2, wherein each of said neighboring pre-pit regions includes VFO regions for the extraction of clock, and wherein the respective VFO regions include recording mark edges that are aligned in the radial direction of said optical disk.

7. An optical disk device, according to claim 7, wherein the surface of said optical disk includes of a plurality of circumferential zones, wherein the number of recording tracks in an outermost circumferential zone and in an innermost circumferential zone is reduced so that the shortest recording mark length is nearly equal among said plurality of zones.

8. An optical disk device, according to claim 2, wherein each of said pre-pit regions has a concave/convex structure whose depth or height is $\lambda/10n$ to $\lambda/4n$, where $\lambda$ is a wavelength of light beam and n is a refractive index of said optical disk.

9. An optical disk device, according to claim 2, wherein each of said pre-pit regions has a width in the radial direction equal or less than that of the land region or groove region on either side of the pre-pit region in the radial direction.

* * * * *